(12) United States Patent
Gostin et al.

(10) Patent No.: US 9,830,283 B2
(45) Date of Patent: Nov. 28, 2017

(54) MULTI-MODE AGENT

(71) Applicant: Hewlett Packard Enterprise Development LP, Houston, TX (US)

(72) Inventors: Gary Gostin, Plano, TX (US); Martin Goldstein, Campbell, CA (US); Russ W. Herrell, Fort Collins, CO (US); Craig Warner, Coppell, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 193 days.

(21) Appl. No.: 14/786,822

(22) PCT Filed: May 16, 2013

(86) PCT No.: PCT/US2013/041374
§ 371 (c)(1),
(2) Date: Oct. 23, 2015

(87) PCT Pub. No.: WO2014/185917
PCT Pub. Date: Nov. 20, 2014

(65) Prior Publication Data
US 2016/0077985 A1 Mar. 17, 2016

(51) Int. Cl.
*G06F 13/14* (2006.01)
*G06F 13/00* (2006.01)
(Continued)

(52) U.S. Cl.
CPC ............ *G06F 13/20* (2013.01); *G06F 13/124* (2013.01); *G06F 13/4282* (2013.01)

(58) Field of Classification Search
None
See application file for complete search history.

(56) References Cited

U.S. PATENT DOCUMENTS 5,367,520 A * 11/1994 Cordell ............... H04L 12/5601
340/2.28
5,647,033 A 7/1997 Laughlin
(Continued)

FOREIGN PATENT DOCUMENTS

| CN | 1983224 | 6/2007 |
| CN | 101990002 | 3/2011 |
| WO | WO-2012037494 A1 | 3/2012 |

OTHER PUBLICATIONS

Anders, Mark et al; A 2.9Tb/s 8W 64-Core Circuit-switched Network-on-Chip in 45 n; Circuit Research Lab. Intel Corporation; IEEE 2008.

(Continued)

*Primary Examiner* — Michael Sun
(74) *Attorney, Agent, or Firm* — Mannava & Kang, P.C.

(57) ABSTRACT

According to an example, a multi-mode agent may include a processor interconnect (PI) interface to receive data from a processor and to selectively route the data to a node controller logic block, a central switch, or an optical interface based on one of a plurality of modes of operation of the multi-mode agent. The modes of operation may include a glueless mode where the PI interface is to route the data directly to the optical interface and bypass the node controller logic block and the central switch, a switched glueless mode where the PI interface is to route the data directly to the central switch for routing to the optical interface, and bypass the node controller logic block, and a glued mode where the PI interface is to route the data directly to the node controller logic block for routing to the central switch and further to the optical interface.

15 Claims, 8 Drawing Sheets

(51) Int. Cl.
 *G06F 13/20* (2006.01)
 *G06F 13/12* (2006.01)
 *G06F 13/42* (2006.01)

(56) References Cited

U.S. PATENT DOCUMENTS

| | | | |
|---|---|---|---|
| 6,687,247 B1* | 2/2004 | Wilford | H04L 45/00 370/392 |
| 7,865,655 B2 | 1/2011 | Li et al. | |
| 7,907,624 B2 | 3/2011 | Manula et al. | |
| 2002/0126677 A1* | 9/2002 | Hathaway | H04L 49/3081 370/395.64 |
| 2003/0236919 A1 | 12/2003 | Johnson et al. | |
| 2008/0307145 A1 | 12/2008 | Goren et al. | |
| 2009/0292881 A1 | 11/2009 | Sirvaramakrishnan et al. | |
| 2010/0325308 A1 | 12/2010 | Keckler et al. | |
| 2011/0029734 A1 | 2/2011 | Pope et al. | |
| 2011/0129225 A1* | 6/2011 | Gostin | H04B 10/801 398/66 |
| 2011/0280569 A1 | 11/2011 | Binkert et al. | |
| 2011/0302346 A1 | 12/2011 | Vahdat et al. | |
| 2012/0079156 A1 | 3/2012 | Safranek et al. | |
| 2012/0275784 A1* | 11/2012 | Soto | H04B 10/2503 398/38 |
| 2013/0103875 A1 | 4/2013 | Chang et al. | |
| 2014/0281071 A1* | 9/2014 | Xu | G06F 13/4045 710/105 |
| 2015/0023196 A1* | 1/2015 | Schlenk | G06F 11/3006 370/252 |

OTHER PUBLICATIONS

Hammami, O. et al; "Migrating Single FPGA Chip Multiprocessor with Network on Chip to 65nm and 45 nm ASIC"; IEEE 2011.
Extended European Search Report dated Oct. 14, 2016; EP Application No. 13884773.6; pp. 15.
Freescale Semiconductor, Inc.; http://cache.freescale.com/files/32bit/doc/prod_brief/MPC8560PB.pdf >; Dec. 4, 2003.
http://deinoscloud.wordpress.com/2012/10/, Two Main Scale-Up Server Architectures, Oct. 2012; See p. 1, lines 10-30; and p. 2, lines 20-30.
International Search Report and Written Opinion dated Feb. 24, 2014, PCT Patent Application No. PCT/US2013/041374 dated May 16, 2013, Korean Intellectual Property Office.

* cited by examiner

MULTI-MODE AGENT

CLAIM FOR PRIORITY

The present application is a national stage filing under 35 U.S.C. §371 of PCT application number PCT/US2013/041374, having an international filing date of May 16, 2013, the disclosure of which is hereby incorporated by reference in its entirety.

BACKGROUND

Converged infrastructure typically includes the packaging of multiple information technology (IT) components into a single, optimized computing solution. For example, IT organizations may use converged infrastructure or other such techniques to centralize the management of IT resources, consolidate systems, increase resource utilization rates, and lower costs. Converged infrastructure and other such techniques may be used to provide customers with the ability to implement scale-up. For example, processors may be used to integrate functions of components such as memory controllers and input/output (I/O) bridges, and to interconnect the functionality of these components using high speed links. In order to achieve the fabric bandwidths needed for applications, the bit rates of such high speed links used with processors continue to increase. These bit rates and other factors can impact scalability of solutions related to the foregoing aspects.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
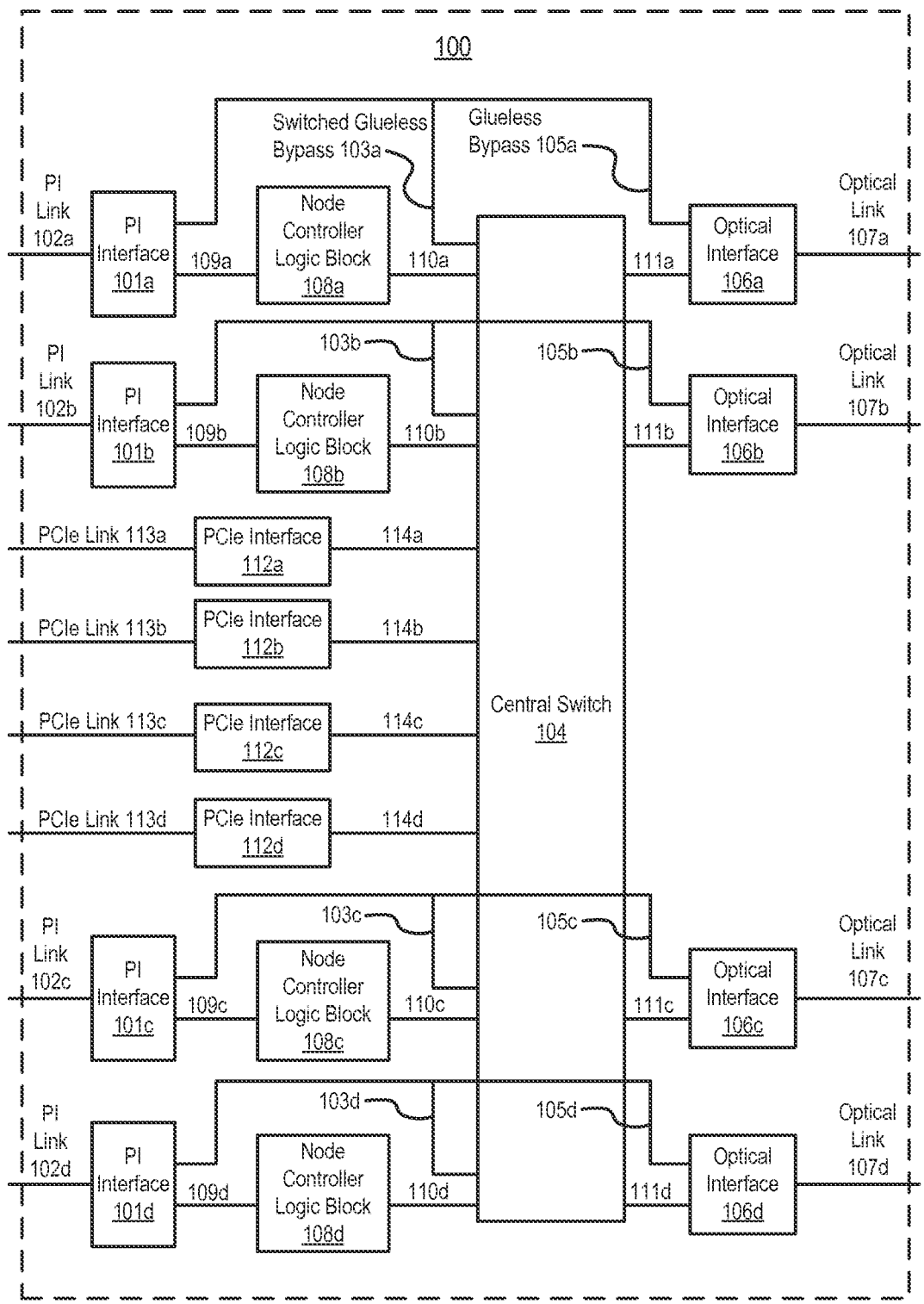
FIG. 1 illustrates an architecture of a multi-mode agent for an optical system fabric for glueless, switched glueless, and glued systems, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A multi-mode agent for an optical system fabric is described herein for use with glueless, switched glueless, and glued systems. A glueless system may be referred to as a system where a maximum number of sockets in a server is determined by a processor's native protocols and available native link routing mechanisms, and not extended through the use of node controller logic (i.e., the node controller logic block as described herein). Similarly, for a switched glueless system, the maximum number of sockets in a server is still determined by the processor's native protocols, but the number of routes between the sockets supported in the native system may be increased by performing additional address decode, and converting the processor's native protocol as needed across a system fabric. For a glued system, the number of sockets in a system and the number of routes between sockets may both be increased by performing additional address decode, and converting the processor's native protocol as needed across a system fabric.

For glueless systems, the multi-mode agent may be used to improve performance aspects related, for example, to bandwidth and distance. For example, for glueless systems, the multi-mode agent may be used to support low latency needed for such systems by bypassing a node controller logic block and a central switch. For switched glueless and glued systems, the multi-mode agent may be used in conjunction with a switch to improve performance aspects related, for example, to bandwidth and distance. For example, for switched glueless and glued systems, the multi-mode agent and the switch may provide flexibility with respect to grouping of blades (i.e., blades of a server) and scalability with respect to partitioning of the switched glueless and glued systems. The multi-mode agent and the switch may be designated as VLSI components of an optical system fabric. For example, the optical system fabric may include the multi-mode agent and the switch, and other components (e.g., optical manifold, fibers, connectors, etc.) that are needed to implement functions of the multi-mode agent and the switch. The multi-mode agent and the switch may provide for reduction in product development, manufacturing, and field costs associated with such glueless, switched glueless, and glued systems. The multi-mode agent and the switch may also provide for increased flexibility, and serviceability, and improved management of such glueless, switched glueless, and glued systems.

The multi-mode agent may be implemented as an application specific integrated circuit (ASIC). By using a common multi-mode agent for glueless systems, and a common multi-mode agent and switch for switched glueless and glued systems, a common blade may be used for all systems. The use of a common multi-mode agent and switch may provide for reduction in costs related to research and development, manufacturing, and field costs related to implementation of converged infrastructure and other such techniques.

The design of the multi-mode agent and the switch may be based on optical module technology. The multi-mode agent may interface processors and peripheral component interconnect express (PCIe) cards to an optical system fabric. According to an example, the processors may include point-to-point processor interconnect (PI) links, such as INTEL QUICKPATH INTERCONNECT (QPI) links. The multi-mode agent may include a plurality of coherency, PCIe, and optical links. According to an example, the optical links may be one-half of the width of the coherency links (e.g., QPI links), and execute at greater than twice the bit rate of the coherency links. Based on this configuration, an optical link may be bandwidth matched to a coherency link to minimize fabric latency, and may further reduce overall system cost by reducing a number of lasers, photo-detectors, and optical fibers. The switch of the optical system fabric may be a non-blocking switch with all optical links. The switch may be used when topologies exceed what can be built using directly connected multi-mode agents (e.g., for a glueless system).

According to an example, a multi-mode agent may include a PI interface to receive data from a processor and to selectively route the data directly to a node controller logic block, a central switch, or an optical interface based on one of a plurality of modes of operation of the multi-mode agent. The plurality of modes of operation of the multi-mode agent may include a glueless mode of operation where the PI interface is to route the data directly to the optical interface and bypass the node controller logic block and the central switch, a switched glueless mode of operation where the PI interface is to route the data directly to the central switch for routing to the optical interface, and bypass the node controller logic block, and a glued mode of operation where the PI interface is to route the data directly to the node controller logic block for routing to the central switch and further to the optical interface.

FIG. 1 illustrates an architecture of a multi-mode agent 100 for use with glueless, switched glueless, and glued systems, according to an example of the present disclosure. Referring to FIG. 1, the multi-mode agent 100 is depicted as including a point-to-point processor interconnect (PI) interface (e.g., one of the PI interfaces 101a-101d) for a PI link (e.g., one of the associated PI links 102a-102d) to processors. For example, the multi-mode agent 100 may include a QUICKPATH INTERCONNECT (QPI) interface for a QPI link to processors, such as, INTEL EX or EP processors that include QPI links. In another example, the multi-mode agent 100 may include a Hypertransport (HT) interface for an HT link to processors such as AMD processors. Alternate interfaces for other processor types may also be used. The QPI link may also be generally designated as a coherent link. In the example of FIG. 1, four PI interfaces 101a-101d, and four associated PI links 102a-102d are shown. However, those skilled in the art would appreciate in view of this disclosure that fewer or additional PI interfaces and corresponding PI links, and other components of the multi-mode agent 100 may be used as needed.

A switched glueless bypass (e.g., one of the switched glueless bypasses 103a-103d) may be provided for linking the PI interface to a central switch 104, and operation of the multi-mode agent 100 in a switched glueless mode.

A glueless bypass (e.g., one of the glueless bypasses 105a-105d) may be provided for linking the PI interface to an optical interface (e.g., one of the optical interfaces 106a-106d), and operation of the multi-mode agent 100 in a glueless mode.

Each optical interface may be linked via an optical link (e.g., one of the optical links 107a-107d) to an optical manifold as described with reference to FIGS. 3 and 4.

Each PI interface may be linked to a node controller logic block (e.g., one of the node controller logic blocks 108a-108d) via a link (e.g., one of the associated links 109a-109d). The node controller logic block may provide for expansion of an optical system fabric, for example, by allowing additional sockets to be connected together in a server. The node controller logic block may also provide for address decode and routing of packets. The node controller logic block may include a node controller logic specific protocol to communicate with other node controller logic blocks on other agents, as described with reference to FIG. 3. The node controller logic blocks may include internal components that can generally be classified as filter cache control blocks and remote request control blocks. The node controller logic blocks, and particularly the remote request control blocks of the node controller logic blocks may serve as intermediaries between the optical system fabric and the remaining portions of the multi-mode agent 100. The filter cache control blocks allow for communication between the respective node controller logic blocks. The node controller logic blocks may provide a filter cache architecture in which multiple local cache coherency domains may be bridged together using a global coherency domain so that a scalable, shared memory multiprocessor system can be built using microprocessors with "on-chip" memory controllers.

Each node controller logic block may be linked to the central switch 104 via a node controller logic block to central switch link (e.g., one of the node controller logic block to central switch links 110a-110d). The central switch 104 may thus link the node controller logic block to any an optical interface.

The central switch 104 may be linked to the optical interface via a central switch to optical interface link (e.g., one of the central switch to optical interface links 111a-111d).

The multi-mode agent 100 may further include a PCIe card interface (e.g., one of the PCIe interfaces 112a-112d (also designated as PCIe card interfaces)) for a PCIe link (e.g., one of the associated PCIe links 113a-113d). In the example of FIG. 1, each of PCIe links may include eight lanes. Further, the PCIe card interface may be linked to the central switch 104 by a PCIe card interface to central switch link (e.g., one of the PCIe card interface to central switch links 114a-114d). The PCIe card interface may receive transactions from any PCIe link source such as input/output (I/O) cards, PCIe root port host bridges, or PCIe switches, encapsulate the transactions into packets based on a fabric specific protocol for a glueless, switched glueless, or glued system, and forward the encapsulated packets to the central switch 104, which may further forward the packets to a specific optical interface.

The central switch 104 may provide for receiving and forwarding of packets between different PI interfaces (e.g., one of the PI interfaces 101a-101d), node controller logic blocks (e.g., one of the node controller logic blocks 108a-108d), PCIe card interfaces (e.g., one of the PCIe card interfaces 112a-112d), and optical interfaces (e.g., one of the optical interfaces 106a-106d).

Figure 2:
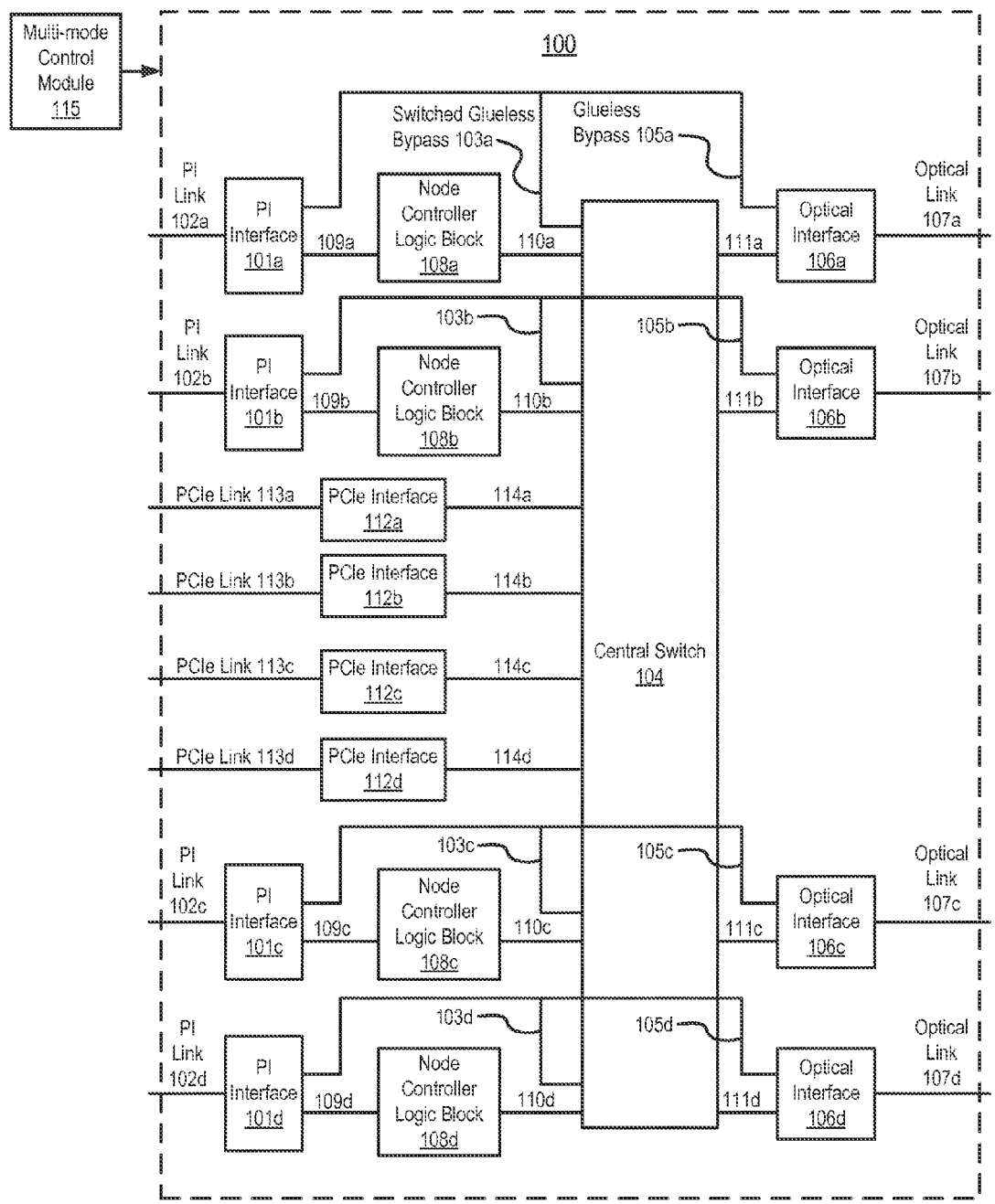
FIG. 2 illustrates an architecture of control logic for the multi-mode agent of FIG. 1, according to an example of the present disclosure.

Referring to FIGS. 1 and 2, FIG. 2 illustrates an architecture of control logic for the multi-mode agent 100 of FIG. 1, according to an example of the present disclosure. The control logic for the multi-mode agent 100 may include a multi-mode control module 115 to control operation of the multi-mode agent 100 in one of three modes of operation that include glueless, switched glueless, and glued modes. For example, the multi-mode control module 115 may control operation of the multi-mode agent 100 in a glueless mode of operation as described herein with respect to the glueless system 120 of FIG. 3. Further, the multi-mode control module 115 may control operation of the multi-mode agent 100 in switched glueless or glued modes of operation as described herein with respect to the switched glueless or glued systems 140 illustrated in FIG. 4.

Figure 3:
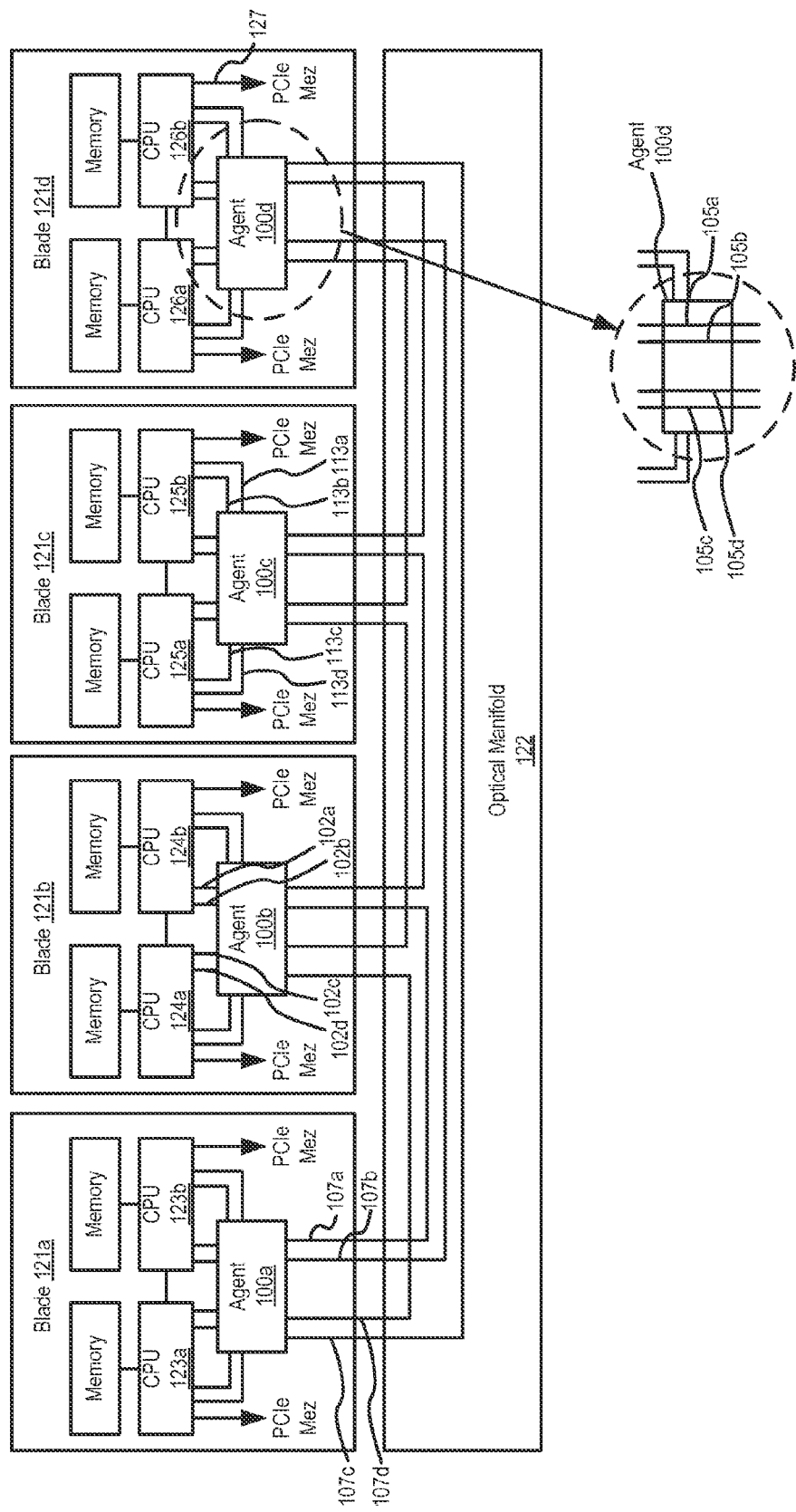
FIG. 3 illustrates an architecture of a glueless system, according to an example of the present disclosure.

Referring to FIGS. 1 and 3, FIG. 3 illustrates an architecture of a glueless system 120, according to an example of the present disclosure. Referring to FIG. 3, the glueless system 120 is depicted as including a plurality of blades (e.g., blades 121a-121d) interconnected by an optical manifold 122. For the example of FIG. 3, four blades 121a-121d are shown. However those skilled in the art would appreciate in view of this disclosure that fewer or additional blades may be used. Each blade may respectively include one of the multi-mode agents 100 (e.g., agents 100a-100d). Components such as the PI links 102a-102d, optical links 107a-107d, and PCIe links 113a-113d of the multi-mode agents 100a-100d are shown in FIG. 3. Each of the multi-mode agents 100a-100d may interface processors to the optical manifold 122 of the optical fabric system. For example, the multi-mode agent 100a may interface processors 123a and 123b (i.e., CPUs 123a and 123b) to the optical manifold 122. Examples of processors may include INTEL EX or EP processors with QPI links, as described below, or other processors such as AMD processors, etc. The example of the glueless system 120 may further include links for PCIe mezzanine (mez) cards that include I/O adapters. For example, the links 127 for PCIe mez cards may each include 16 lanes.

Referring to FIG. 3, in the example shown, the glueless system 120 may include four blades 121a-121d, with each blade respectively including an agent 100a-100d and sockets with one link between any two processors (i.e., CPUs), and two links from each processor to the associated agent. Based on the configuration of FIG. 3, components may be placed on a blade (e.g., the blade 121a) to optimize aspects such as electrical interconnect performance, power, and cooling, without concern for the length of the optical links to agents on the other blades (e.g., the blades 121b-121d). Based on the configuration of FIG. 3, the multi-mode agents 100a-100d may convert each electrical PI link to optics. Further, the multi-mode agents 100a-100d may internally bypass the node controller logic block (e.g., the node controller logic blocks 108a-108d) and the central switch 104 by using respective glueless bypasses (e.g., one of the glueless bypasses 105a-105d) to minimize latency for improved performance. The multi-mode agents 100a-100d may therefore each include the glueless bypasses 105a-105d as shown on the bottom right of FIG. 3. The glueless mode for the multi-mode agent 100 may also be designated as a pass-through mode.

For the example of the glueless system 120 of FIG. 3, the optical manifold 122 may be used to transfer packets and other information between blades. For example, the optical links 107a-107d of each agent 100a-100d may use the optical manifold 122 to transfer packets and other information between the blades 121a-121d. Thus, the optical manifold 122 may provide the interconnectivity between the multi-mode agents 100a-100d as needed for communication between the blades 121a-121d. In order to change the configuration of the glueless system 120, the optical manifold is changed as needed (e.g., an optical manifold prewired for two sets of four sockets may be replaced with an optical manifold prewired for eight sockets) to modify the connectivity between blades.

For the example of the glueless system 120 of FIG. 3, the PI interface (e.g., one of the PI interfaces 101a-101d) for an agent (e.g., the multi-mode agent 100a) may receive a PI packet from a processor (e.g., the CPU 123a) and relay the PI packet directly to an optical interface (e.g., the appropriate optical interface 106a-106d). In relaying the PI packet directly to an optical interface, the PI packet may be converted from a PI protocol to an internal protocol specific to the glueless system and then to an optical version of PI.

For the glueless system 120, the blades 121a-121d may be in fixed locations in a chassis (i.e., the chassis for the glueless socket system), which may limit expansion of input/output (I/O) beyond what is available on each blade. Such limitations may be addressed by using switches, as shown in FIG. 4 with components of the glueless system of FIG. 3. For example, referring to FIG. 4, FIG. 4 illustrates an architecture applicable to switched glueless and glued systems 140, according to an example of the present disclosure. The switched glueless and glued systems 140 are illustrated in the architecture of FIG. 4 to facilitate the similar description thereof. For an actual switched glueless system architecture, the glueless system architecture of FIG. 3 may be modified by replacing the optical manifold 122 of FIG. 3 with optical manifold 148 and switches 142a-142d such that the four switch topology still connects the links (e.g., optical links 107a-107d), and the connections, which are no longer fixed routes, go through the switches 142a-142d.

Figure 4:
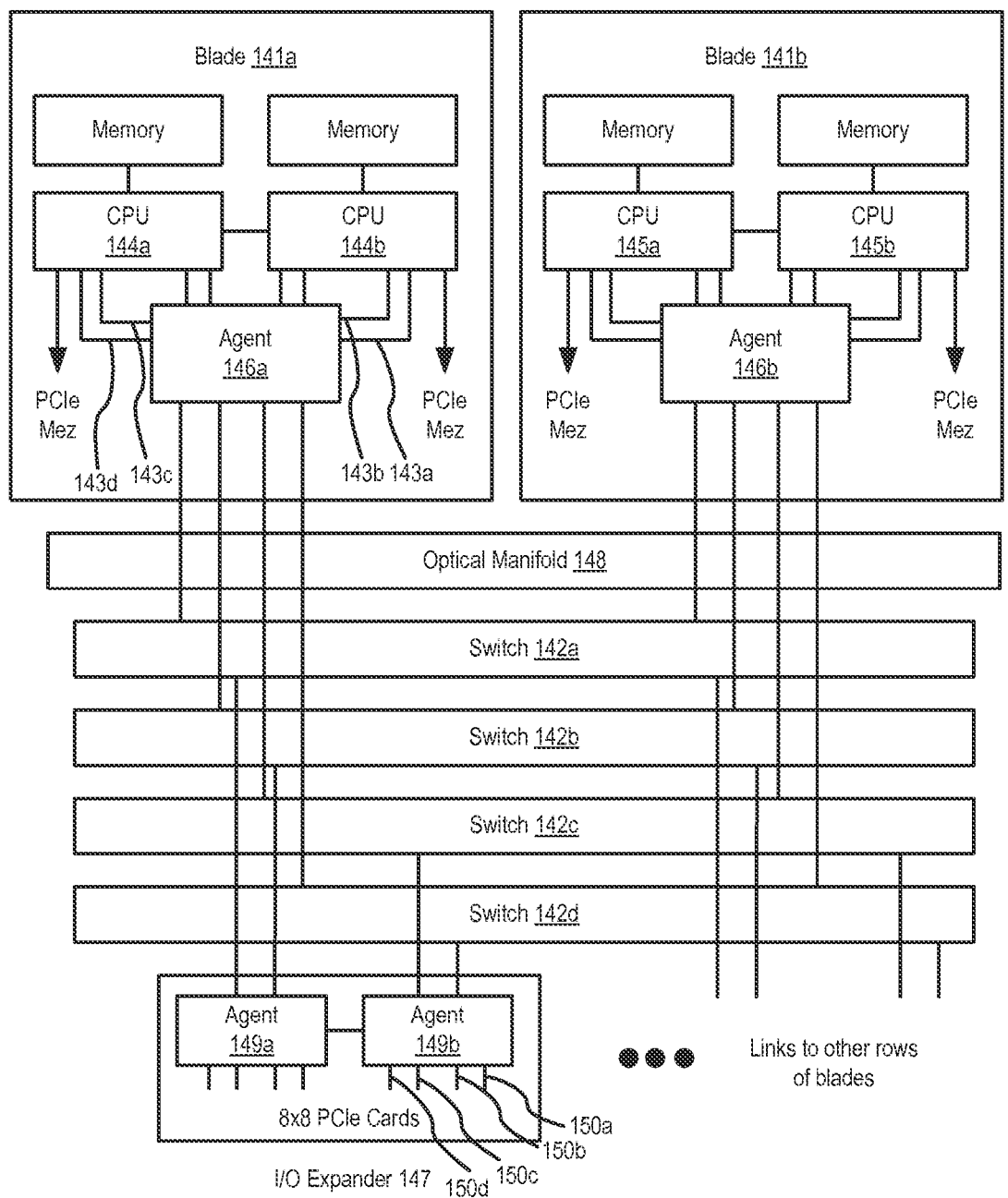
FIG. 4 illustrates an architecture applicable to switched glueless and glued systems, according to an example of the present disclosure.
Figure 5:
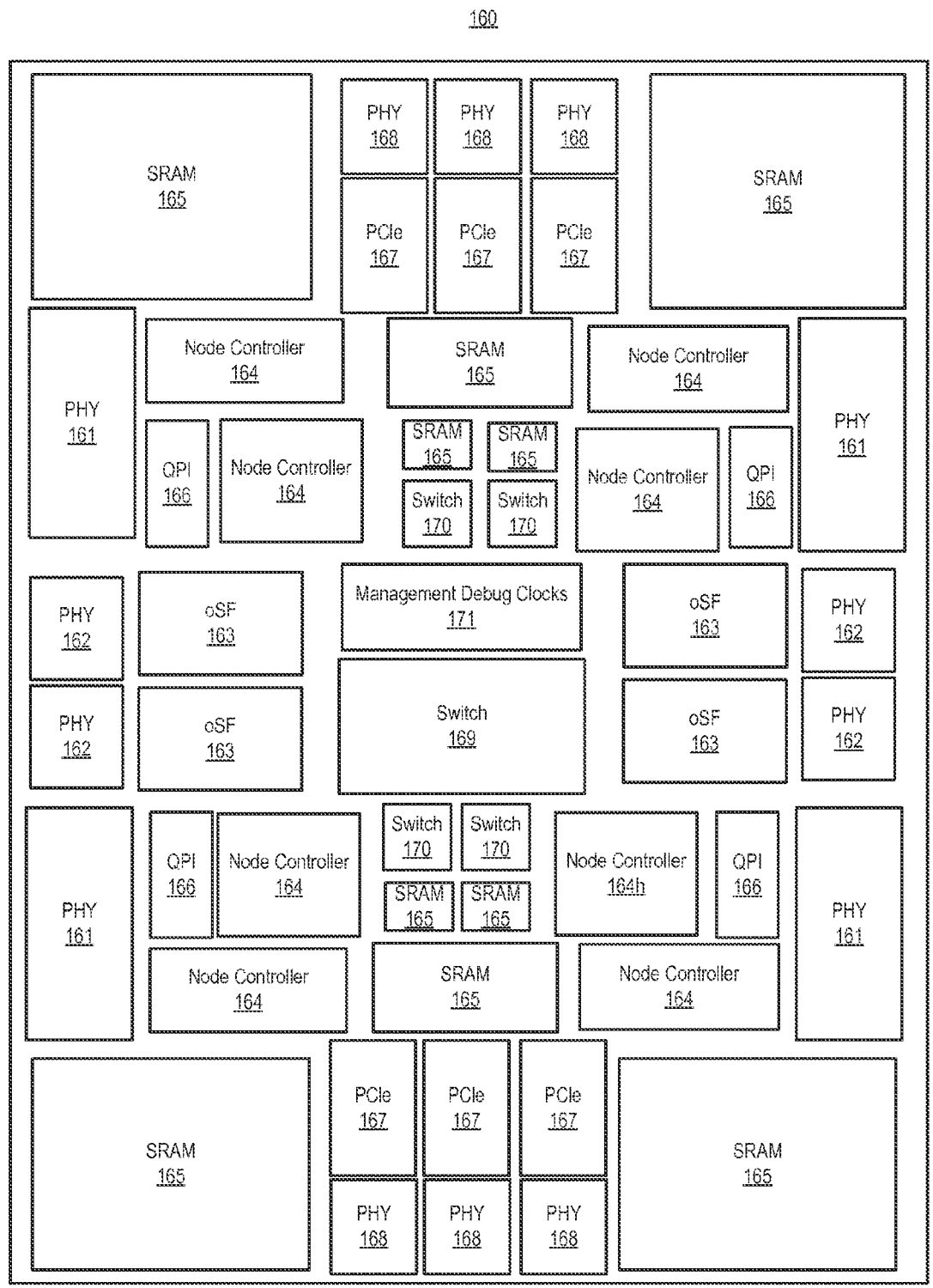
FIG. 5 illustrates a multi-mode agent die for use with glueless, switched glueless, and glued systems, according to an example of the present disclosure.

Referring to FIG. 4, the switched glueless system may generally partition a configuration that includes, for example, greater than 8 sockets, into configurations that include multiple 2 to 8 socket servers (e.g., one to four blades). Referring to FIG. 4, while an individual server in the switched glueless system may be limited in size by the native protocol of processors (e.g., 8 sockets, etc.), blades (e.g., blades 141a and 141b (similar to blades 122a-122d of FIG. 3)) may be placed anywhere in switched glueless or glued systems to expand the capacity of the server enclosure for example, to 64 sockets. The size of each server instance may be dynamically increased or decreased, for example, by re-directing PI traffic within switches (e.g., switches 142a-142d). The re-direction of PI traffic within the switches (e.g., switches 142a-142d) may also provide for on-line repair of blades (e.g., blades 141a and 141b). PCIe links (e.g., PCIe links 143a-143d) from the processors (e.g., CPUs 144a, 144b, 145a, and 145b) may be routed through agents (e.g., agents 146a and 146b) and switches (e.g., switches 142a-142d) to I/O expanders (e.g., a plurality of I/O expander 147) to increase the I/O connectivity of the system. For a switched glueless system, the node controller logic block (e.g., the node controller logic blocks 108a-108d as shown in FIG. 1) inside the agent may be bypassed to reduce latency. For example, the switched glueless bypass (e.g., the switched glueless bypasses 103a-103d) as shown in FIG. 1 may be used to bypass the node controller logic block. For individual servers whose socket count is less than or equal to the maximum natively supported by the processor, the switched glueless system provides similar flexibility as a glued system, without the performance impact of the node controller logic block. The switched glueless and glued systems 140 may further include an optical manifold 148 to provide optical interconnectivity for optical links (e.g., the optical links 107a-107d as shown in FIG. 1) with switches (e.g., switches 142a-142d). In the example of FIG. 4, the optical manifold 148 may be a pass-through optical manifold.

For the switched glueless and glued system example of FIG. 4, for the agents 146a and 146b respectively disposed in the blades 141a and 141b, the PCIe links (e.g., PCIe links 143a-143d) from the processors (e.g., CPUs 144a, 144b, 145a, and 145b) may be routed through agents (e.g., the agents 146a and 146b) and switches (e.g., switches 142a-142d) to I/O expanders (e.g., a plurality of I/O expander 147) to increase the I/O connectivity of the system. The I/O expanders (e.g., a plurality of I/O expander 147) may similarly include agents (e.g., agents 149a and 149b). For the agents 149a and 149b, PCIe links (e.g., PCIe links 150a-150d) may communicate directly with I/O cards. Therefore, in the example of FIG. 4, the switches 142a-142d may be used to route traffic between any of the agents 146a, 146b, 149a, and 149b.

For the example of the switched glueless system 140 of FIG. 4, the PI interface (e.g., one of the PI interfaces 101a-101d) for an agent (e.g., the agent 146a) may receive a PI packet from a processor (e.g., the CPU 144a) and relay the PI packet to the central switch 104, which may further relay the PI packet to another PI interface (e.g., one of the other PI interfaces 101a-101d), or to an optical interface (e.g., the appropriate optical interface 106a-106d). Similarly, PCIe packets may be relayed between different PCIe links. In relaying the PI packet to the central switch 104, the PI packet may be wrapped in a customized fabric packet wrapper specific to the switched glueless system 140 such that the central switch 104 may recognize the wrapped PI packet and relay the wrapped PI packet as needed.

With continued reference to FIG. 4, for servers that are to be scaled beyond a maximum number of sockets supported by native CPU protocols, glued systems may be created using similar components and topology as switched glueless systems, for example, by initiating the node controller logic (e.g., one of the node controller logic blocks 108a-108d) within the multi-mode agent 100. Therefore, for glued systems, compared to glueless systems that use a glueless bypass (e.g., one of the glueless bypasses 105a-105d) and switched glueless systems that use a switched glueless bypass (e.g., one of the switched glueless bypasses 103a-103d) of an agent, the node controller logic (e.g., one of the node controller logic blocks 108a-108d) may be initiated to route packets from a PI interface (e.g., one of the PI interfaces 101a-101d) to the central switch 104.

For the example of the glued system 140 of FIG. 4, the PI interface (e.g., one of the PI interfaces 101a-101d) for an agent (e.g., the agent 146a) may receive a PI packet from a processor (e.g., the CPU 144a) and relay the PI packet to a node controller logic block (e.g., one of the node controller logic blocks 108a-108d) and then to the central switch 104, which may further relay the PI packet to another node controller logic block (e.g., one of the node controller logic blocks 108a-108d), to a PCIe interface (e.g., the appropriate PCIe interface 112a-112d), or to an optical interface (e.g., the appropriate optical interface 106a-106d). In relaying the PI packet to the node controller logic block and then to the central switch 104, the PI packet may be wrapped in a customized fabric packet wrapper specific to the glued system 140 such that the central switch 104 may recognize the wrapped PI packet and relay the wrapped PI packet as needed. For the glued system 140, the PI packet may be wrapped to modify aspects such as addresses related to additional nodes that are supported by the node controller logic block of the glued system 140.

Referring to FIGS. 1-5, FIG. 5 illustrates a multi-mode agent die 160 for use with glueless, switched glueless, and glued systems, according to an example of the present disclosure. The multi-mode agent die 160 may include physical (PHY) layer logic blocks 161 (i.e., PI or QPI links) and adjacently disposed optical links 162. The multi-mode agent die 160 may further include optical system fabric (oSF) blocks 163 (i.e., optical interfaces). Node controller blocks 164 may be disposed adjacent SRAMs 165. The multi-mode agent die 160 may further include QPI (or PI) interfaces 166, PCIe (or PI) interfaces 167, PCIe (or PI) links 168, switch 169 (i.e., central switch), switches 170, and management debug clocks 171. The management debug clocks 171 may control management functions, and include clock controllers and a debug clock. The positioning of the fabric links in the middle of the multi-mode agent die 160 (which is illustrated as being implemented as an ASIC) and the QPI links (or PI links) above and below the fabric links may provide the glueless system configuration with low latencies from QPI (or PI) to optics. For operation of the multi-mode agent die 160 in switched glueless and glued modes, such switched glueless and glued systems may likewise benefit from the QPI (or PI) to optical link proximity for operation traffic.

Referring to FIGS. 1-5, for operation of the multi-mode agent die 160 in a glueless mode (e.g., with the glueless system 120 of FIG. 3), the PHY layer logic blocks 161, optical links 162, oSF blocks 163, QPI interfaces 166, and management debug clocks 171 may be used on the multi-mode agent die 160.

For operation of the of the multi-mode agent die 160 in a switched glueless mode (e.g., with the switched glueless system 140 of FIG. 4), the PHY layer logic blocks 161, optical links 162, oSF blocks 163, QPI interfaces 166, PCIe interfaces 167, PCIe links 168, switch 169, and management debug clocks 171 may be used on the multi-mode agent die 160.

For operation of the of the multi-mode agent die 160 in a glued mode (e.g., with the glued system 140 of FIG. 4), all of the components of the multi-mode agent die 160 may be used.

For the multi-mode agent die 160, unused blocks may be power gated such that power consumption of the multi-mode agent die 160 may be reduced in glueless and switched glueless systems. For example, in a glueless system, the node controller logic block, the PCIe (or PI) interfaces and the central switch may be power gated. In a switched glueless system, the node controller logic block may be power gated.

The modules (e.g., the module 115) and components of the multi-mode agent 100 and the glueless, switched glueless, and glued systems described herein that perform various functions, may also include machine readable instructions stored on a non-transitory computer readable medium. In addition, or alternatively, the modules and components of the multi-mode agent 100 and the glueless, switched glueless, and glued systems described herein may include hardware or a combination of machine readable instructions and hardware.

Figure 6:
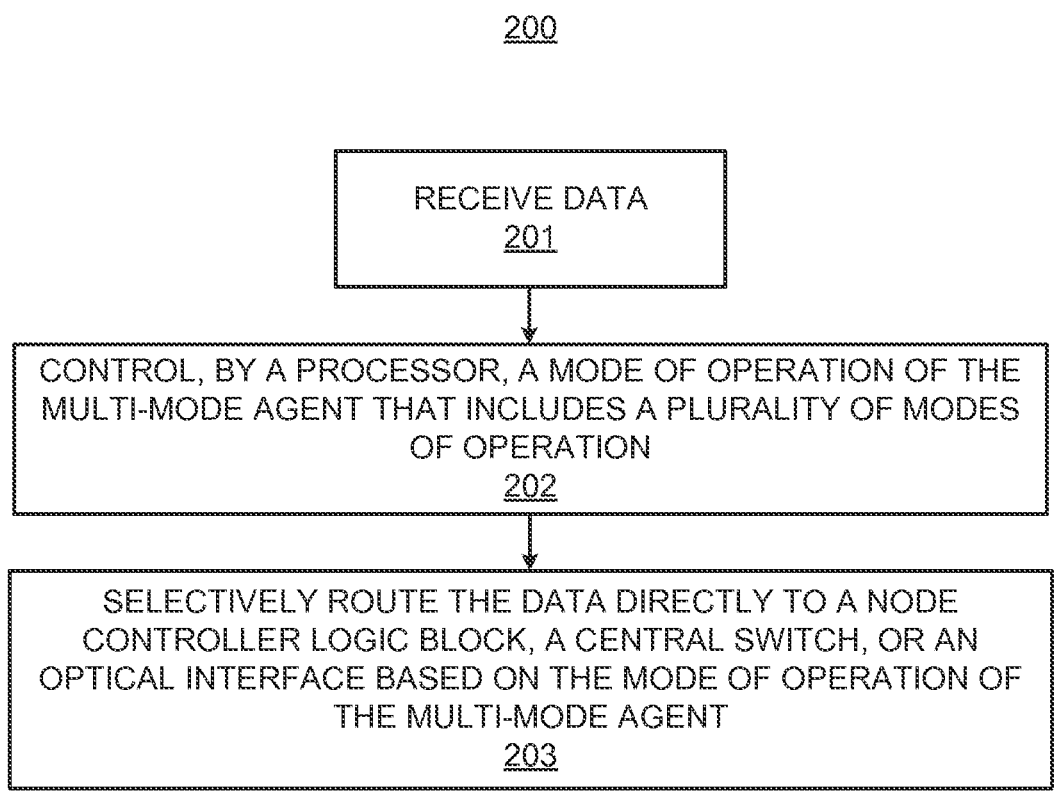
FIG. 6 illustrates a method for implementing a multi-mode agent, according to an example of the present disclosure.
Figure 7:
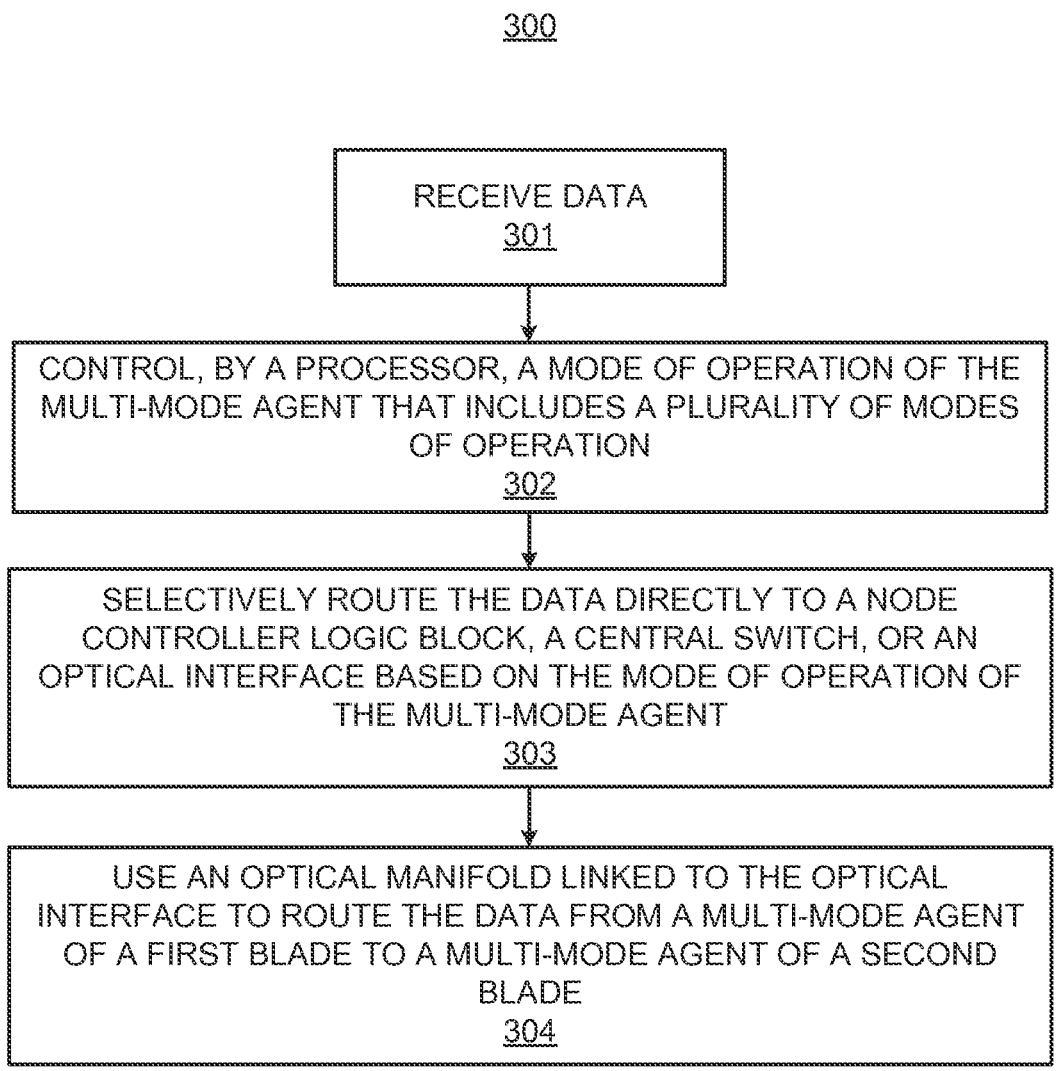
FIG. 7 illustrates further details of the method for implementing a multi-mode agent, according to an example of the present disclosure.

FIGS. 6 and 7 respectively illustrate flowcharts of methods 200 and 300 for implementing a multi-mode agent, corresponding to the example of the multi-mode agent 100 whose construction is described in detail above. The methods 200 and 300 may be implemented on the multi-mode agent 100 with reference to FIG. 1 by way of example and not limitation. The methods 200 and 300 may be practiced in other apparatus (e.g., other multi-mode agents, glueless, switched glueless, glued systems, etc.).

Referring to FIG. 6, for the method 200, at block 201, data may be received. For example, referring to FIGS. 1 and 3, the PI interfaces 101a-101d may receive data from a processor (e.g., a CPU).

At block 202, a mode of operation of the multi-mode agent that includes a plurality of modes of operation may be controlled. For example, referring to FIG. 2, the multi-mode control module 115 may control operation of the multi-mode agent 100 in one of three modes of operation that include glueless, switched glueless, and glued modes. The multi-mode control module 115 may be provided in the multi-mode agent die 160, for example, within the management debug clocks 171.

At block 203, the data may be directly routed to a node controller logic block, a central switch, or an optical interface based on the mode of operation of the multi-mode agent. For example, referring to FIG. 1, the PI interface (e.g., one of the PI interfaces 101a-101d) may route the data to a node controller logic block (e.g., one of the node controller logic blocks 108a-108d), the central switch 104, or an optical interface (e.g., one of the optical interfaces 106a-106d) based on the mode of operation of the multi-mode agent. The modes of operation may include a glueless mode of operation where a PI interface is to route the data directly to the optical interface and bypass the node controller logic block and the central switch, a switched glueless mode of operation where the PI interface is to route the data directly to the central switch for routing to the optical interface, and bypass the node controller logic block, and a glued mode of operation where the PI interface is to route the data directly to the node controller logic block for routing to the central switch and further to the optical interface.

Referring to FIG. 7, for the method 300, at block 301, data may be received.

At block 302, a mode of operation of the multi-mode agent that includes a plurality of modes of operation may be controlled.

At block 303, the data may be directly routed to a node controller logic block, a central switch, or an optical interface based on the mode of operation of the multi-mode agent.

At block 304, an optical manifold linked to the optical interface may be used to route the data from a multi-mode agent of a first blade to a multi-mode agent of a second blade. For example, referring to FIGS. 1 and 3, the optical manifold 122 linked to an optical interface (e.g., one of the optical interfaces 106a-106d) may be used to route the data from a multi-mode agent (e.g., one of the multi-mode agents 100a-100d) of a first blade (e.g., one of the blades 121a-121d) to a multi-mode agent of a second blade. Further, referring to FIG. 4, the optical manifold may be a pass-through optical manifold (e.g., the optical manifold 148). The optical system fabric that includes the multi-mode agents may further include a plurality of switches (e.g., switches 142a-142d) to route the data from the multi-mode agent of the first blade (e.g., the blade 141a) to the multi-mode agent of the second blade (e.g., the blade 141b). The plurality of switches may further route the data to a multi-mode agent of an input/output (I/O) expander (e.g., the I/O expander 147).

Figure 8:
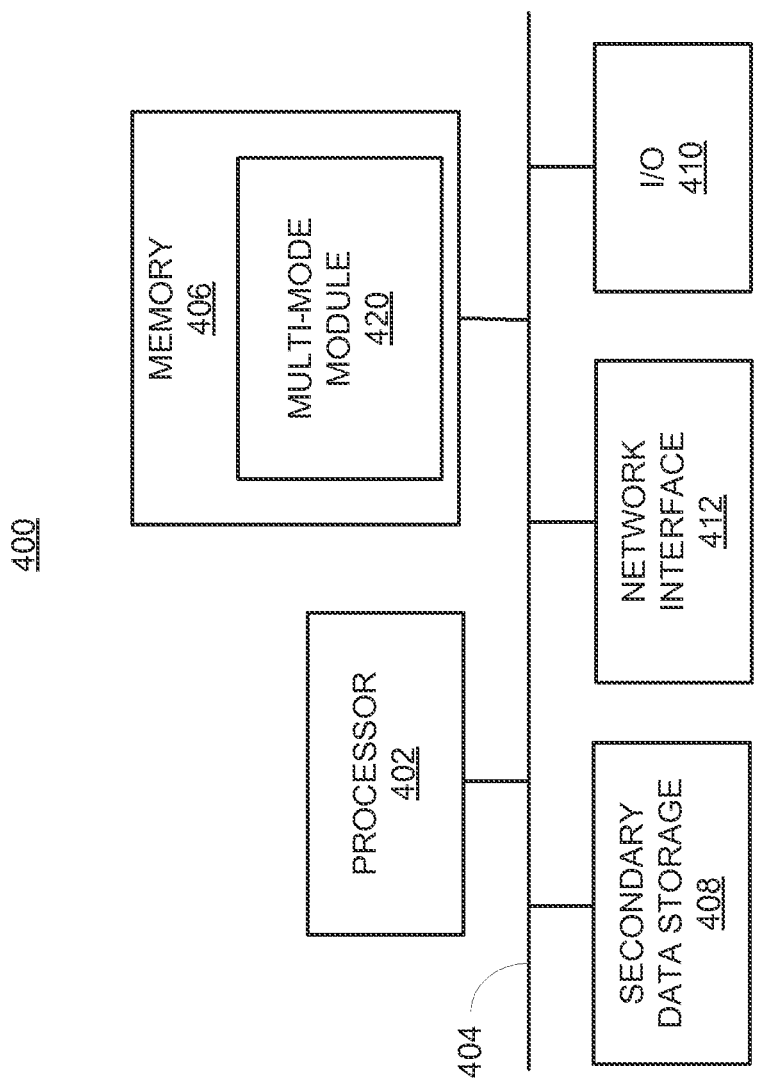
FIG. 8 illustrates a computer system, according to an example of the present disclosure.

FIG. 8 shows a computer system 400 that may be used with the examples described herein. The computer system represents a generic platform that includes components that may be in a server or another computer system. The computer system 400 may be used as a platform for the multi-mode agent 100. The computer system 400 may execute, by a processor or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 includes a processor 402 that may implement or execute machine readable instructions performing some or all of the methods, functions and other processes described herein. Commands and data from the processor 402 are communicated over a communication bus 404. The computer system also includes a main memory 406, such as a random access memory (RAM), where the machine readable instructions and data for the processor 402 may reside during runtime, and a secondary data storage 408, which may be non-volatile and stores machine readable instructions and data. The memory and data storage are examples of computer readable mediums. The memory 406 may include a multi-mode module 420 including machine readable instructions residing in the memory 406 during runtime and executed by the processor 402. The multi-mode module 420 may include the components of the multi-mode agent 100 shown in FIG. 1.

The computer system 400 may include an I/O device 410, such as a keyboard, a mouse, a display, etc. The computer system may include a network interface 412 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A multi-mode agent comprising:
    a processor interconnect (PI) interface to receive data from a processor and to selectively route the data directly to a node controller logic block, a central switch, or an optical interface based on one of a plurality of modes of operation of the multi-mode agent,
    wherein the plurality of modes of operation of the multi-mode agent include:
        a glueless mode of operation where the PI interface is to route the data directly to the optical interface and bypass the node controller logic block and the central switch,
        a switched glueless mode of operation where the PI interface is to route the data directly to the central switch for routing to the optical interface, and bypass the node controller logic block, and
        a glued mode of operation where the PI interface is to route the data directly to the node controller logic block for routing to the central switch and further to the optical interface.

2. The multi-mode agent of claim 1, wherein the multi-mode agent is implemented as an application specific integrated circuit (ASIC).

3. The multi-mode agent of claim 1, wherein the PI interface is a QUICKPATH INTERCONNECT (QPI) interface.

4. The multi-mode agent of claim 1, further comprising:
    a peripheral component interconnect express (PCIe) interface to receive input/output (I/O) transactions from the processor or I/O cards.

5. The multi-mode agent of claim 1, wherein the data is received as packets, and wherein the PI interface is to encapsulate the packets based on one of the plurality of modes of operation of the multi-mode agent.

6. An optical system fabric comprising:
a plurality of multi-mode agents, each of the multi-mode agents includes:
a processor interconnect (PI) interface to receive data from a processor and to selectively route the data directly to a node controller logic block, a central switch, or an optical interface based on one of a plurality of modes of operation of a multi-mode agent,
wherein the plurality of modes of operation of the multi-mode agent include:
a glueless mode of operation where the PI interface is to route the data directly to the optical interface and bypass the node controller logic block and the central switch,
a switched glueless mode of operation where the PI interface is to route the data directly to the central switch for routing to the optical interface, and bypass the node controller logic block, and
a glued mode of operation where the PI interface is to route the data directly to the node controller logic block for routing to the central switch and further to the optical interface; and
an optical manifold linked to the optical interface to route the data from a multi-mode agent of a first blade to a multi-mode agent of a second blade, wherein the plurality of multi-mode agents include the multi-mode agent of the first blade and the multi-mode agent of the second blade.

7. The optical system fabric of claim 6, wherein the optical manifold is a pass-through optical manifold, the optical system fabric further comprises:
a plurality of switches to route the data from the multi-mode agent of the first blade to the multi-mode agent of the second blade.

8. The optical system fabric of claim 7, wherein the plurality of switches are to route the data to a multi-mode agent of an input/output (I/O) expander.

9. The optical system fabric of claim 8, wherein the multi-mode agent of the I/O expander includes a peripheral component interconnect express (PCIe) interface to receive input/output (I/O) transactions from the processor or I/O cards.

10. The optical system fabric of claim 6, wherein the multi-mode agents are implemented as application specific integrated circuits (ASICs).

11. The optical system fabric of claim 6, wherein the PI interface is a QUICKPATH INTERCONNECT (QPI) interface.

12. The optical system fabric of claim 6, wherein the data is received as packets, and wherein the PI interface is to encapsulate the packets based on one of the plurality of modes of operation of the multi-mode agent.

13. A method of implementing a multi-mode agent, the method comprising:
receiving data;
controlling a mode of operation of the multi-mode agent that includes a plurality of modes of operation; and
selectively routing the data directly to a node controller logic block, a central switch, or an optical interface based on the mode of operation of the multi-mode agent, wherein the plurality of modes of operation of the multi-mode agent include:
a glueless mode of operation where a processor interconnect (PI) interface is to route the data directly to the optical interface and bypass the node controller logic block and the central switch,
a switched glueless mode of operation where the PI interface is to route the data directly to the central switch for routing to the optical interface, and bypass the node controller logic block, and
a glued mode of operation where the PI interface is to route the data directly to the node controller logic block for routing to the central switch and further to the optical interface.

14. The method of claim 13, further comprising:
implementing the multi-mode agent as an application specific integrated circuit (ASIC).

15. The method of claim 13, wherein the PI interface is a QUICKPATH INTERCONNECT (QPI) interface.

* * * * *